(12) United States Patent
Morocco et al.

(10) Patent No.: US 7,083,492 B1
(45) Date of Patent: Aug. 1, 2006

(54) ADJUSTABLE-TONE DEER CALL HAVING A REED CONTACT BAND

(75) Inventors: Steven Morocco, 131 Stoy Rd., Somerset, PA (US) 15501-4636; Angelo Cassette, Greensburg, PA (US)

(73) Assignee: Steven Morocco, Somerset, PA (US)

( * ) Notice: Subject to any disclaimer, the term of this patent is extended or adjusted under 35 U.S.C. 154(b) by 140 days.

(21) Appl. No.: 10/781,331

(22) Filed: Feb. 17, 2004

Related U.S. Application Data

(60) Provisional application No. 60/447,425, filed on Feb. 14, 2003.

(51) Int. Cl.
*A63H 5/00* (2006.01)

(52) U.S. Cl. .................. 446/208; 446/202; 446/206

(58) Field of Classification Search ............. 446/200, 446/202, 203, 207, 208, 209, 206; 84/363, 84/364, 383 A, 383 R
See application file for complete search history.

(56) References Cited

U.S. PATENT DOCUMENTS

| | | | |
|---|---|---|---|
| 4,210,055 A * | 7/1980 | Platamone, Jr. ............ 84/383 R |
| 4,221,075 A | 9/1980 | Gallagher | |
| 4,347,776 A * | 9/1982 | Grass et al. ............... 84/383 R |
| 4,888,903 A * | 12/1989 | Knight et al. .................... 43/1 |
| 4,915,660 A | 4/1990 | Overholt, Sr. | |
| 4,940,451 A | 7/1990 | Leady | |
| 5,222,903 A | 6/1993 | Parrott et al. | |
| 5,456,152 A * | 10/1995 | Cusack et al. ............ 84/383 R |
| 5,582,530 A * | 12/1996 | Ady ............................ 446/209 |
| 5,643,039 A * | 7/1997 | McIntyre ..................... 446/208 |
| 5,648,623 A * | 7/1997 | Silverstein et al. ....... 84/383 R |
| 5,975,978 A | 11/1999 | Hall | |
| 6,039,627 A * | 3/2000 | Forbes et al. ............... 446/208 |
| 6,053,794 A | 4/2000 | Weiser | |
| 6,083,075 A | 7/2000 | Meeks | |
| 6,106,357 A | 8/2000 | Weiser | |
| 6,471,563 B1 * | 10/2002 | Carlton ....................... 446/202 |

\* cited by examiner

*Primary Examiner*—Faye Francis
(74) *Attorney, Agent, or Firm*—Elman Technology Law, P.C.; Gerry J. Elman

(57) ABSTRACT

An apparatus for calling deer, and methods of its use; the apparatus having an adjustable sliding element moved longitudinally by the user to adjust the dimension x of a vibrating reed to vary the sound generated by the deer call. The device includes a barrel assembly having a cut-out opening in its side, with a vibrating reed mounted therein on a reed holder. A tone-adjusting slide assembly, manually accessible through the cut-out opening, has a reed contact band extending transversely and clampingly across the reed so as to clamp it at any of various selectable locations depending on the axial position of the tone-adjusting slide assembly. The pitch of the sound can be adjusted without disassembling the deer call.

14 Claims, 4 Drawing Sheets

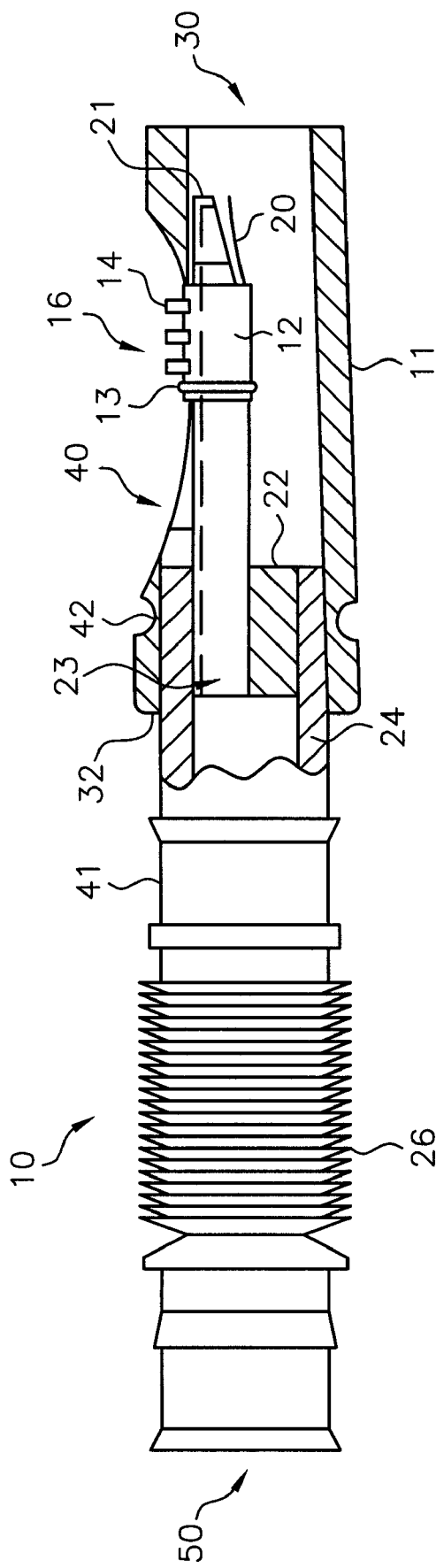
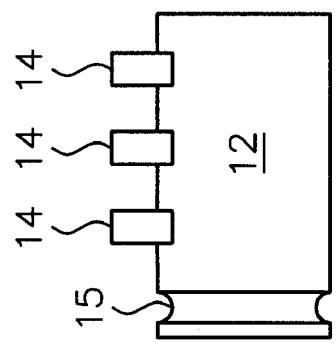
FIG. 3B
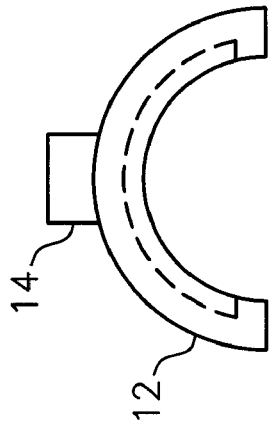
FIG. 3A
FIG. 3

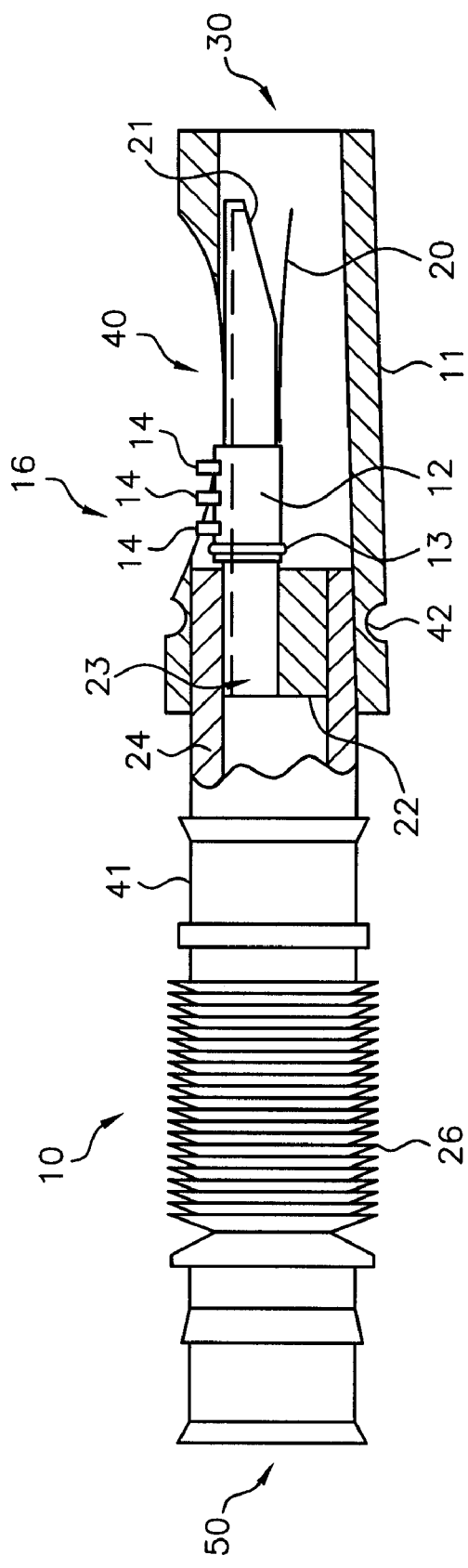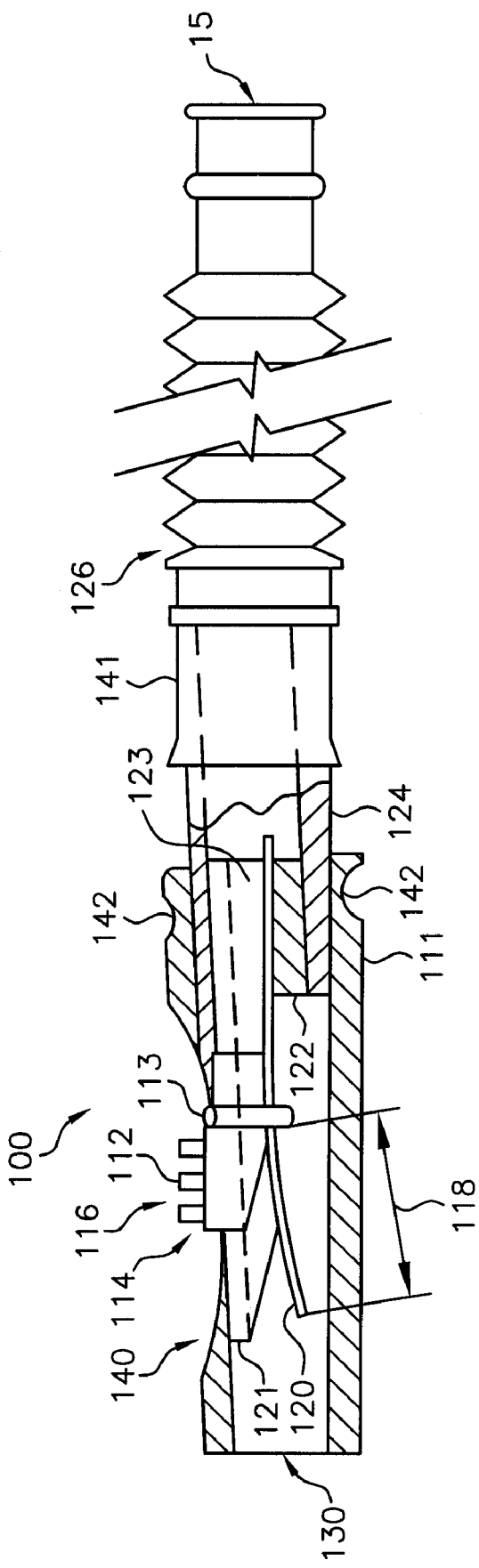

US 7,083,492 B1

ADJUSTABLE-TONE DEER CALL HAVING A REED CONTACT BAND

BACKGROUND

This invention relates to a device and method for calling wildlife and, more particularly, to a device which emulates a variety of sounds produced by deer.

Deer hunters typically employ a number of methods for calling a deer within range to be shot by a rifle, bow, or other weapon. Typically, the sounds are produced by calls having a reed placed within a longitudinal passage. The hunter forces air from the hunter's lungs through the passage and the reed vibrates to produce a tone emulating a deer sound.

SUMMARY

A deer call in accordance with the disclosed invention comprises an outside barrel forming a mouthpiece with an inlet and outlet end, having a reed disposed within and a movable tone-adjusting slide assembly containing a reed contact band extending outside of the mouthpiece. When a user forces air from the inlet end of the mouthpiece, air passes over and vibrates the reed, and an animal sound is simulated. Axial movement (by which is meant herein "movement along an axis") of the tone-adjusting slide assembly along the axis of the reed allows the user to vary the tone of the sound produced by the call, that is, its pitch. Thus the animal sound can be made without any particular skills associated with playing musical instruments.

The present invention provides a deer call having a tone-adjusting slide assembly with an axially adjustable reed contact band that clamps around the reed and thereby substantially prevents movement of the reed between the reed contact band and a wedge at the base of the reed. Axial movement of the slide assembly allows the user to vary the frequency of the vibratory portion of the reed. The contact band provides a clamp on the reed, and can be adjusted to change the pitch of the call. This change in pitch is independent of a separate ability to change the sound resonance by adjusting the optional extension hose. The tone-selecting slide is accessible through an opening provided for this purpose in the larger outside barrel. The reed contact band may, among other configurations, assume in use the shape of a sideways-rotated D.

Axially moving the tone-selecting slide assembly containing the reed contact band results in a change in the clamping position on the reed, thus changing pitch. Additionally, a removable extension hose, optionally provided at an end opposite the mouthpiece end of the call, can be used to increase sound volume as by resonance and is typically constructed to be expanded or contracted, in an accordion-like manner, as a bellows.

The present invention provides a deer call that produces the full continuum of varying sounds produced by male and female deer by clamping the base of the reed to vary the length of the vibrating portion of the reed (the length sometimes being referred to herein as "dimension x"). When dimension x is shortened, the sound produced by the call has a tone of a higher frequency than before. The adjustable-tone call allows the user to quickly and accurately switch among a variety of different sounds produced by a deer. The deer call may further comprise a lanyard, secured around the outside barrel, desirably having a spring extending perpendicularly of the barrel and holding together a pair of strands of the lanyard, thereby facilitating quick use of the deer call.

These and other related features of this invention will become apparent upon review of the present specification in conjunction with the drawings.

BRIEF DESCRIPTION OF THE DRAWINGS

The features of the invention noted above are explained in more detail with reference to the embodiments illustrated in the attached drawing figures, in which like reference numerals denote like elements, and in which:

FIG. 3 is a side view in partial cross-section of the deer call of FIG. 1, wherein the tone-adjusting slide assembly has been moved axially by the user towards the inlet end of the outside barrel of the deer call, thereby decreasing the dimension of the reed and increasing the pitch of the sound generated by the deer call. For clarity, the lanyard illustrated in FIG. 1 is omitted.

FIG. 3A is an enlarged view from the rear of the tone-adjusting slide assembly shown in FIG. 3 wherein the reed contact band is omitted.

FIG. 3B is an enlarged view from the side of the tone-adjusting slide assembly shown in FIG. 3 wherein the reed contact band is omitted.

FIG. 4 is a side view in partial cross-section of the deer call of FIG. 3, wherein the tone-adjusting slide assembly has been moved axially by the user towards the extension hose of the deer call, thereby increasing the dimension of the reed which is free to vibrate and lowering the pitch of the sound generated by the deer call.

FIG. 5 is a side view of an alternative embodiment of an adjustable-tone open-barrel deer call as disclosed herein. A portion is shown in cross-section, and a portion of the removable extension hose is broken away for ease of illustration.

DETAILED DESCRIPTION

Figure 1:
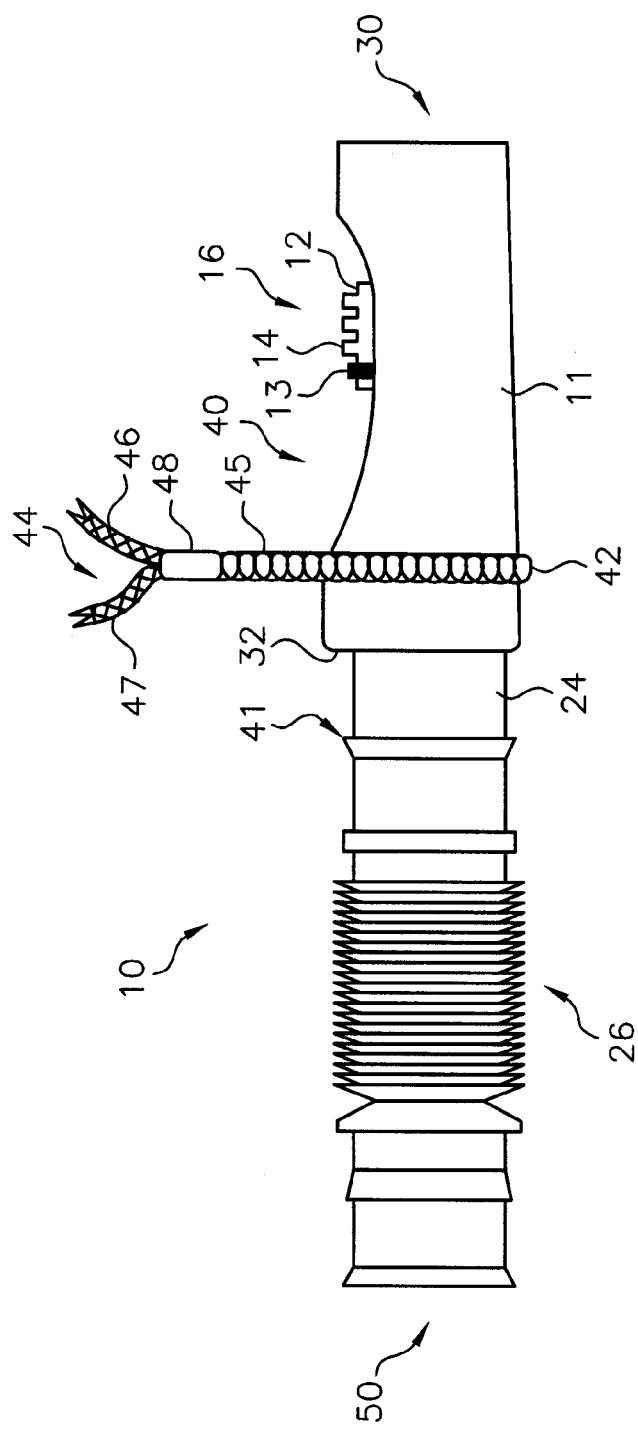
FIG. 1 is a side view of an adjustable-tone deer call as disclosed herein, complete with lanyard.

Referring to the drawings in greater detail, and initially to FIGS. 1–4, an adjustable-tone open-barrel deer call is shown. The call has an outside barrel 11 forming the mouthpiece of the call. The inlet end 30 of the barrel 11 is adapted for being blown into, but the deer call may alternatively be sounded by drawing air from the outlet end. The outside barrel 11 is preferably tapered so that the inlet end 30 has a smaller diameter than the outlet end 32. The outside barrel 11 has a cut-out opening 40 between the inlet end 30 and the outlet end 32. A small inside barrel 24 is force-fit or otherwise frictionally secured such as by interference at its proximal end into the outlet end 32 of the outside barrel 11.

Figure 5A:
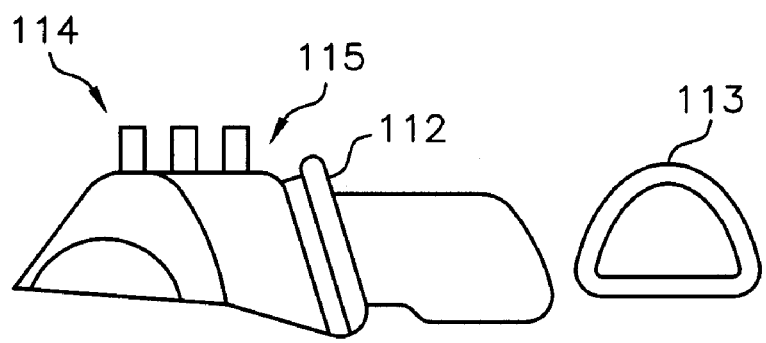
FIG. 5A is an exploded perspective view of the tone-adjusting slide assembly of FIG. 5 and shows the shape assumed by the reed contact band when in use, namely the shape of a sideways-rotated D.

A tone-adjusting slide assembly 16 is mounted for axial movement with respect to the reed holder 21. The user has access to the tone-adjusting slide assembly 16 through the cut-out opening 40 of the outside barrel 11. The tone-adjusting slide assembly 16 comprises an axially sliding element 12 which desirably has a set of upstanding protuberances 14 for frictional engagement with a user's finger. At the distal end of the tone-adjusting slide assembly 16 is a semicircular indentation 15 over which a reed contact band 13 is mounted. The reed contact band 13 extends transversely and clampingly across the reed 20 so as to limit the length of free motion of the reed. The user easily adjusts the tone-adjusting slide assembly 16 in its position over the reed 20 by sliding it axially along the reed holder 21. This causes change in the pitch generated by the reed 20 when the deer call is sounded, as the reed contact band 13 which clamps the reed 20 to the reed holder 21 is in a new position. The reed contact band 13 is of elastic material and may typically be a conventional O-ring (FIGS. 3 and 4) riding in a notch in the tone-adjusting slide assembly 16. As shown in FIG. 5A, in use the reed contact band 13 may have the shape of a sideways-rotated D (FIG. 5), the flat side serving to clamp the reed 20.

The reed 20 is supported within the outside barrel 11 at its proximal end by a reed holder 21. The reed holder 21 has a bottom and a pair of opposing sidewalls joined to its bottom to define an elongated air flow channel 23. The opposing sidewalls of the reed holder 21 decrease in height as they extend in the direction of the inlet end 30. In this embodiment, a wedge 22 is coupled with the distal portion of the reed holder 21 within a smaller inside barrel 24. The reed 20 extends between the wedge 22 and the reed holder 21, terminating at a proximal free end toward the inlet 30 of the outside barrel 11. The proximal end of the reed 20 is free to vibrate when the user blows into the inlet end 30, while covering the cut-out opening 40 with the palm of the user's hand while making a fist. Sound generated by such vibration comes out of the distal opening 50 of an optional removable extension hose 26, which extends from a small inside barrel 24 into which the reed 20 and reed holder 21 are supported by a wedge 22. The extension hose 26, which is desirably friction fit so as to be removable, can be used to increase sound volume as by resonance and is typically constructed to be expanded or contracted, as a bellows, accordion-like.

The user may alternatively sound the deer call by drawing air from the outlet end, for example by sucking or inhaling. In that event, it is not necessary to put one's hand over the cut-out opening 40. The user may do so with the extension hose 26 in place by placing one's mouth at the outlet 50, or may do so with the extension hose 26 removed by placing one's mouth at the outlet of the small barrel 224.

As for the embodiment depicted in FIGS. 1, 3 and 4, tones of high or low pitch may be easily selected by manually moving the tone-adjusting slide assembly 16 by frictionally engaging with one's finger the upstanding protuberances 14 on the sliding element 12 (shown in detail in FIGS. 3A and 3B) and moving axially. This movement causes the reed contact band 13 to change its position with respect to the reed 20, lengthening or shortening the vibrating section of the reed 20, thus enabling the user to select a tone of any of various pitches when sounding the call.

Turning to the embodiment shown in FIGS. 5 and 5A, a similar adjustable-tone open-barrel deer call 100 is shown, with elements numbered in the range of 111 to 150 corresponding generally to elements 11 to 50 of the embodiment shown in FIGS. 1–4.

All of the elements numbered in the range of 111 to 150 have the same configuration, shape, purpose and use as corresponding elements 11 to 50 of the embodiment shown in FIGS. 1–4. As with the embodiment depicted in FIGS. 1–4, tones of high or low pitch may likewise easily be produced by the embodiment shown in FIG. 5 by manually moving the tone-adjusting slide assembly 116 (shown in detail in FIG. 5A) axially. This movement causes the reed contact band 113 to change its position with respect to the reed 120, lengthening or shortening the vibrating section of the reed 120, the length of the vibrating section being shown as having dimension x, thus enabling the user when sounding the call to select from among an infinite variety within a range of pitches defined by the shortest and longest dimension x provided by the geometry of the inner barrel 121 and reed 120.

Figure 6:
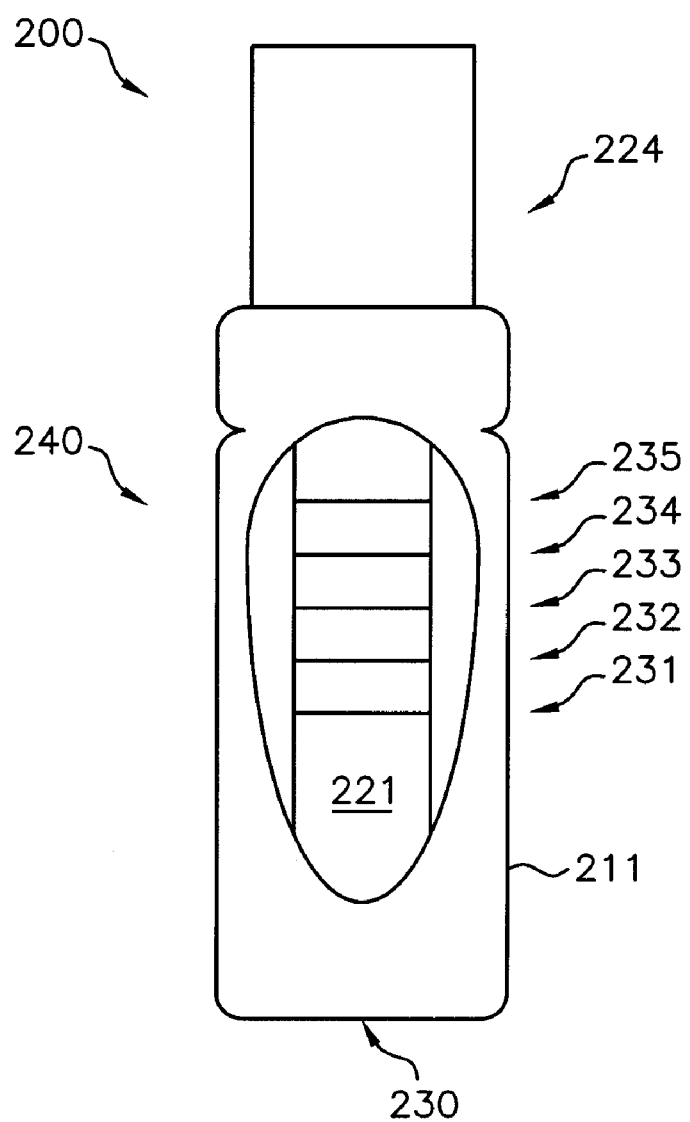
FIG. 6 is a fragmentary top plan view of an adjustable-tone open barrel deer call as disclosed herein, wherein the tone-adjusting slide assembly has been removed and the locations of positions for setting the reed contact band for various calls are marked for illustration.

FIG. 6 illustrates the range of sound of a multi-tone deer call 200 as generally depicted in any of the other figures herein. As shown in FIG. 6, the length of the vibrating section of the reed, dimension x, is changed as the clamping point on the reed is changed, i.e. when the reed contact band is moved. The pitch accordingly changes, so as to simulate any of various different sounds, such as a high-pitched fawn bleat (when the band is in position 231), a doe bawl (position 232), a tending grunt (position 233), a trail grunt (position 234), or a rutting grunt (position 235), or any variation in between. For clarity of illustration, the tone-adjusting slide assembly is omitted.

Although for clarity of illustration in FIGS. 3, 4, and 5, a lanyard is omitted, it is to be understood that the lanyard shown in FIG. 1 is optionally, and desirably, employed in connection with the version of the invention shown in FIGS. 3, 4, and 5.

As shown in FIGS. 1, 3, and 4, the barrel 11 is desirably provided with a circular groove 42 for securing a generally circular lanyard 44 therearound. Likewise, as shown in FIG. 5, the barrel 111 is desirably provided with a circular groove 142 for securing a generally circular lanyard 44 therearound. The lanyard may be of woven material like a shoestring. As depicted in FIG. 1, a coil spring 45 that is generally perpendicular to the axis of the barrel 11 (or the barrel 111 as depicted in FIG. 5), contains and holds together the two branches 46 and 47 of the lanyard 44 for approximately 3 cm., being slightly compressed by a clamp 48, desirably of metal. This keeps the lanyard out of the way of the user's hands and facilitates quick use of the deer call. The lanyard may be of any convenient overall length, e.g. 1 meter, such that the doubled-up lanyard extends for approximately 0.5 meter from the barrel 11 (or the barrel 111 as depicted in FIG. 5) to facilitate carrying around the users neck.

In this manner, the present invention provides an adjustable-tone deer call which may be fabricated quite efficiently.

In a preferred embodiment, the outside barrel 11 of FIGS. 1, 3 and 4 and the small barrel 24 of FIGS. 1, 3 and 4 are made from a solid plastic material and frictionally secured such as by an interference fit to one another. Similarly, in the alternative embodiment, the outside barrel 111 of FIG. 5 and the small barrel 124 of FIG. 5 are made from a solid plastic material and frictionally secured such as by an interference fit to one another. Similarly, the reed holder 21 and wedge 22 of FIGS. 3 and 4, as well as the reed holder 121 and wedge 122 of FIG. 5, are desirably made of plastic and frictionally secured such as by an interference fit to one another.

Figure 2:
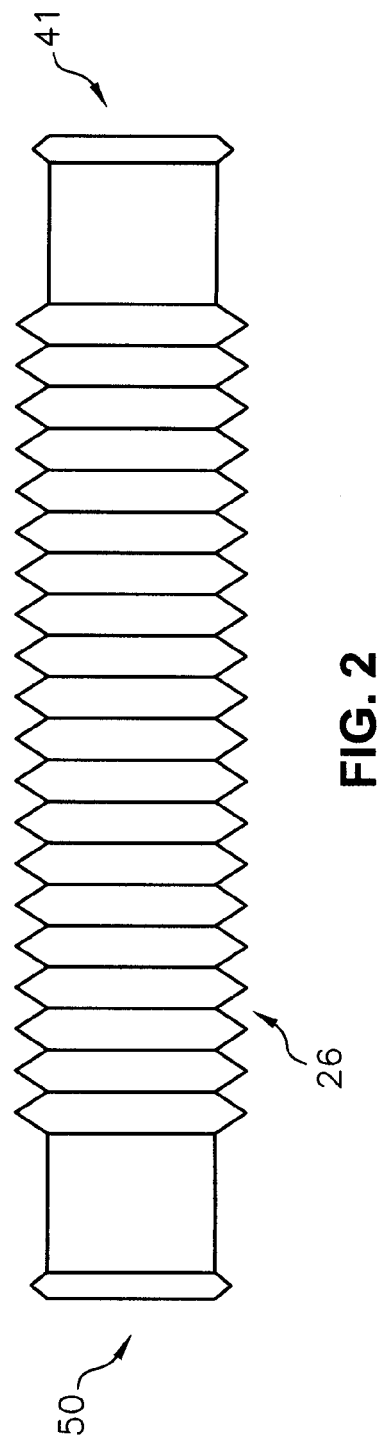
FIG. 2 is a diagrammatic side view of a removable extension hose as used in the present invention.

As shown separately in FIG. 2, the optional extension hose 26 is desirably made from a flexible or rubbery plastic and may be frictionally or otherwise secured around the small barrel 24 of FIGS. 1, 3 and 4 or the small barrel 124 of FIG. 5, at extension hose front end 41 (or extension hose front end 141 as shown in FIG. 5), and may be extended (as shown in FIG. 2) or retracted as a bellows (as shown in FIG. 1 for example), accordion-like, to produce a desired amount of resonance.

In FIGS. 1, 3 and 4, the reed 20 (and in FIG. 5, the reed 120) is preferably formed from a thin plastic material, e.g. MYLAR.

Various routines involving the use of different types, durations, and inflections of sounds are known to lure deer. These routines are easy to learn and reproduce by using the call of the present invention. The infinitely slidable reed contact assembly is particularly effective for switching from one call sound to another, without having to disassemble, adjust and then reassemble the deer call, and is capable of producing a virtually infinite number of call sounds.

From the foregoing it will be seen that this invention is one well adapted to attain the features and advantages hereinabove set forth, together with the other advantages which are obvious and which are inherent to the structure. It will be understood that certain features and subcombinations are of utility and may be employed without reference to other features and subcombinations.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

What is claimed is:

1. An adjustable-tone deer call device comprising:
a barrel assembly comprising an outside barrel and a small inside barrel, the outside barrel having an inlet end adapted to serve as a mouthpiece, having an outlet end for air, and having a cut-out opening between the inlet end and the outlet end thereof, and the small inside barrel having an open proximal end secured inside the outlet end of said outside barrel and a distal end for air to exit;
a reed mounted for vibration within said barrel assembly, said reed having a proximal free end toward the inlet end of said outside barrel, the reed generating a sound of a selected pitch when air passes through the small inside barrel;
a reed holder supporting the reed at its distal end within said barrel assembly, and having sidewalls and a bottom, together forming along with the reed, an elongated air flow channel;
a tone-adjusting slide assembly within said outside barrel and manually accessible through the cut-out opening,
said tone-adjusting slide assembly comprising a slider mounted for axial movement with respect to said reed and a reed contact band extending transversely and clampingly across said reed so as to clamp said reed at any of various selectable locations depending on the axial position of the tone-adjusting slide assembly, whereby the tone of the sound generated by the deer call can be adjusted without disassembling the deer call, wherein said reed contact band comprises an O-ring that extends around a groove in the slider.

2. The deer call device of claim 1 further comprising an extension hose adapted to be expanded and contracted and having a first end and a second end, the first end being removably secured in communication with the distal end of the small inside barrel, whereby the sound may be adjusted by expanding or contracting the extension hose for desired resonance.

3. The deer call device of claim 1, wherein the slider is adapted for frictionally engaging a finger of a user.

4. The deer call device of claim 3, wherein the slider has protuberances thereon.

5. The deer call device of claim 1 further comprising a lanyard secured to the barrel assembly.

6. A method for a user to generate sounds similar to sounds of deer, comprising the steps of:
providing the deer call of claim 1;
manually moving the tone-adjusting slide assembly to the position of the reed contact band that adjusts the vibrating length of the reed to produce a sound of a desired pitch;
temporarily covering the cut out opening; and
forcing air through the inlet end of the outside barrel, whereby the reed vibrates and produces a sound of the desired pitch.

7. The method of claim 6, wherein the cut out opening is temporarily covered by wrapping the users hand around the barrel.

8. The method of claim 6, further comprising the steps of:
temporarily uncovering the cut out opening;
manually moving the tone-adjusting slide assembly to the position of the reed contact band that adjusts the vibrating length of the reed to produce a sound of a second desired pitch;
temporarily covering the cut out opening; and
forcing air through the inlet end of the outside barrel, whereby the reed vibrates and produces a sound of the second desired pitch.

9. The method of claim 6, wherein the desired pitch is that of a high-pitched fawn bleat, a doe bawl, a tending grunt, a trail grunt, or a rutting grunt.

10. A method for a user to generate sounds similar to sounds of deer, comprising the steps of:
providing the deer call device of claim 1;
manually moving the tone-adjusting slide assembly to the position of the reed contact band that adjusts the vibrating length of the reed to produce a sound of a desired pitch; and
drawing air through the distal end of the barrel assembly, whereby the reed vibrates and produces a sound of the desired pitch.

11. A method for a user to generate sounds similar to sounds of deer, comprising the steps of:
providing the deer call device of claim 2;
manually moving the tone-adjusting slide assembly to the position of the reed contact band that adjusts the vibrating length of the reed to produce a sound of a desired pitch;
adjusting the extension hose to provide a desired amount of resonance; temporarily covering the cut out opening; and
forcing air through the inlet end of the outside barrel, whereby the reed vibrates and produces a sound of the desired pitch.

12. The method of claim 11, further comprising the steps of:
temporarily uncovering the cut out opening;
manually moving the tone-adjusting slide assembly to the position of the reed contact band that adjusts the vibrating length of the reed to produce a sound of a second desired pitch;
temporarily covering the cut out opening; and
forcing air through the inlet end of the outside barrel, whereby the reed vibrates and produces a sound of the second desired pitch.

13. A method for a user to generate sounds similar to sounds of deer, comprising the steps of:
providing the deer call device of claim 2;

manually moving the tone-adjusting slide assembly to the position of the reed contact band that adjusts the vibrating length of the reed to produce a sound of a desired pitch;

adjusting the extension hose to provide a desired amount of resonance; and drawing air through the distal end of the barrel assembly, whereby the reed vibrates and produces a sound of the desired pitch.

14. The method of claim 13, further comprising the steps of:

manually moving the tone-adjusting slide assembly to the position of the reed contact band that adjusts the vibrating length of the reed to produce a sound of a second desired pitch; and drawing air through the distal end of the barrel assembly, whereby the reed vibrates and produces a sound of the desired pitch.

* * * * *